Figure 1:
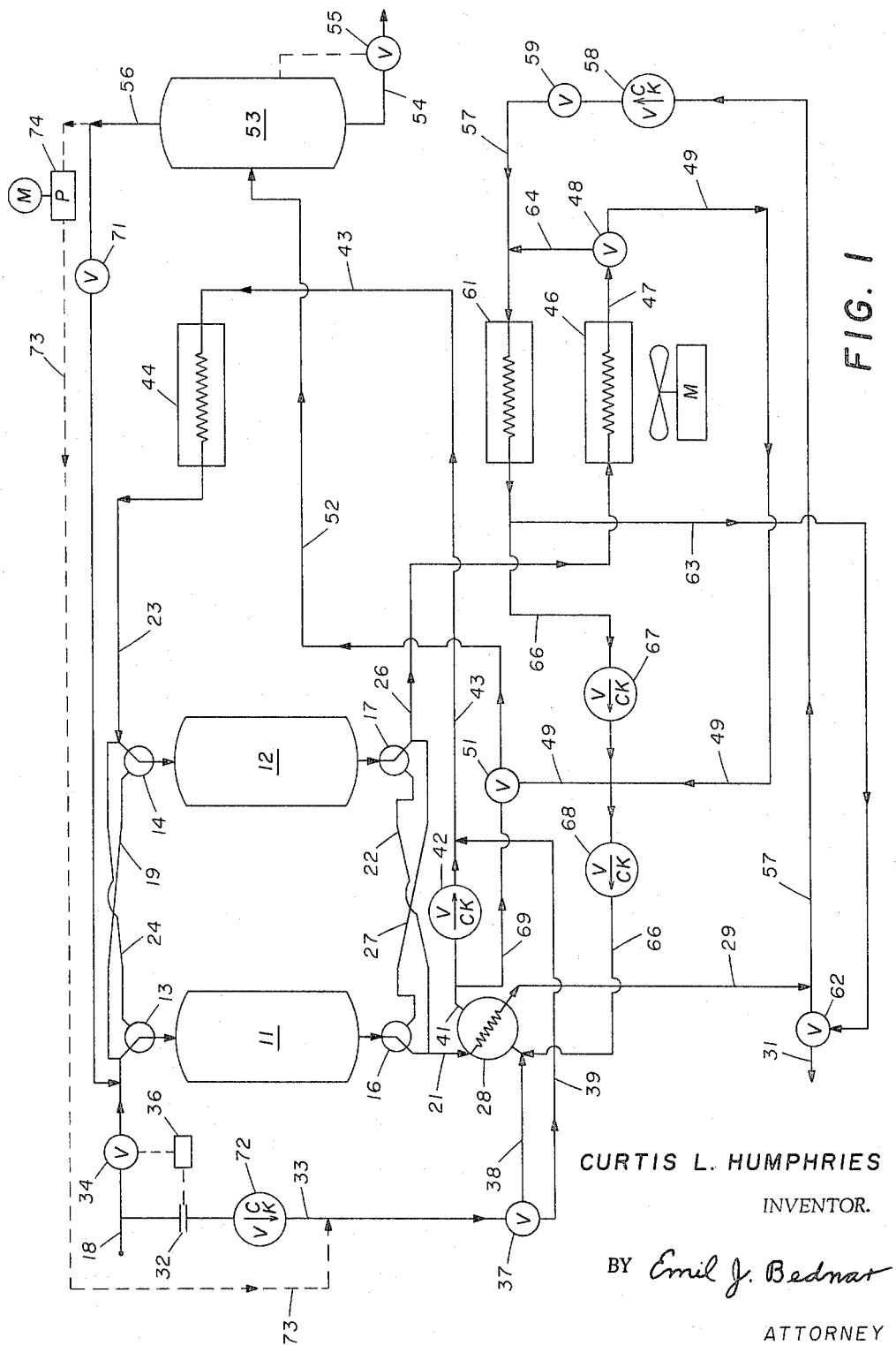

CURTIS L. HUMPHRIES
INVENTOR.

BY Emil J. Bednar
ATTORNEY

Dec. 6, 1966  C. L. HUMPHRIES  3,289,390
HYDROCARBON ADSORPTION APPARATUS AND PROCESS
Filed Dec. 26, 1963  2 Sheets-Sheet 2

CURTIS L. HUMPHRIES
INVENTOR.

BY Emil J. Bednar
ATTORNEY

United States Patent Office 3,289,390
Patented Dec. 6, 1966

3,289,390
HYDROCARBON ADSORPTION APPARATUS
AND PROCESS
Curtis L. Humphries, Dallas, Tex., assignor to Mobil
Oil Corporation, a corporation of New York
Filed Dec. 26, 1963, Ser. No. 333,574
6 Claims. (Cl. 55—62)

This invention relates to recovering hydrocarbons from natural gas by the use of solid adsorbents.

The recovering of hydrocarbons from natural gas streams by adsorption processes practiced in units employing solid adsorbents has incurred renewed interest with the increase in value of the recovered hydrocarbons such as isopentane. Also, the solid adsorbent hydrocarbon recoverey unit is of competitive advantage over other hydrocarbon recovery methods when processing relatively lean natural gas streams.

The conventional solid adsorbent hydrocarbon recovery unit, termed hereinafter merely as "unit," is designed for continuous processing of natural gas streams by proper arrangement of apparatus and process steps. One type of adsorption process uses two relatively large beds of solid adsorbent with moderate instrumentation and an operation cycle for each tower function of long duration, for example several hours, to obtain a desired recovery of hydrocarbons. In such units, the beds are used alternately either on an adsorbing function or on regenerating and cooling functions. Another adsorption process, generally referred to as the small-bed and fast-cycle unit, uses three smaller beds of solid adsorbent as an equivalent procedure to the large-bed units. Complex instrumentation is required so that the beds are used alternately either on adsorbing, regenerating, or cooling functions. These units usually are operated on cycles as short as a fraction of an hour, for example on a 20-minute cycle, for each bed function and provide a recovery of hydrocarbons similar to the units having two large beds.

The operation of a bed of solid adsorbent in known units on the adsorbing function consists mainly in passing natural gas therethrough until such bed adsorbs the heavy hydrocarbons to a desired magnitude. The operation of a bed on the regenerating function consists in passing a suitable regeneration gas at an elevated temperature through the bed until at least a portion of the adsorbed hydrocarbons are desorbed and removed from the bed. The operation of a bed in a regenerating function may be either by open-cycle or closed-cycle regeneration procedures. The open-cycle regeneration procedure uses a portion of the inlet natural gas, or other gas stream, as the regenerating medium. The regeneration gas vented from the bed may be recombined after separation of the desorbed hydrocarbon with the inlet natural gas or other gas stream in the unit. The closed-cycle regeneration procedure uses a heated regeneration gas circulated by a blower in a closed circuit provided by certain regeneration equipment in the unit which includes the bed operated in a regenerating function. The regenerated bed is very hot, for example at about the temperature of the regeneration gas, at the termination of either regeneration procedure. The regenerated bed, in conventional procedures, is then operated in a cooling function by passing relatively cold gas through the bed until the temperature of the solid adsorbent therein is much reduced, usually to a temperature of about 90° F. Only at such lower temperatures is the bed operated in an adsorbing function to complete the operation cycle. Various gas streams have been used for cooling regenerated beds. All conventional units and procedures known to the applicant have required the use of either large beds of adsorbent on a long function cycle with moderate instrumentation, or a plurality of smaller beds of adsorbent on a short function cycle with complex instrumentation, to provide for operating each bed on a cooling function after it is regenerated and before each bed can be operated in the adsorbing function. The difficulties encountered in such known procedures and units can be rectified to a great extent if the required operation of each bed in a cooling function could be omitted.

Figure 2:
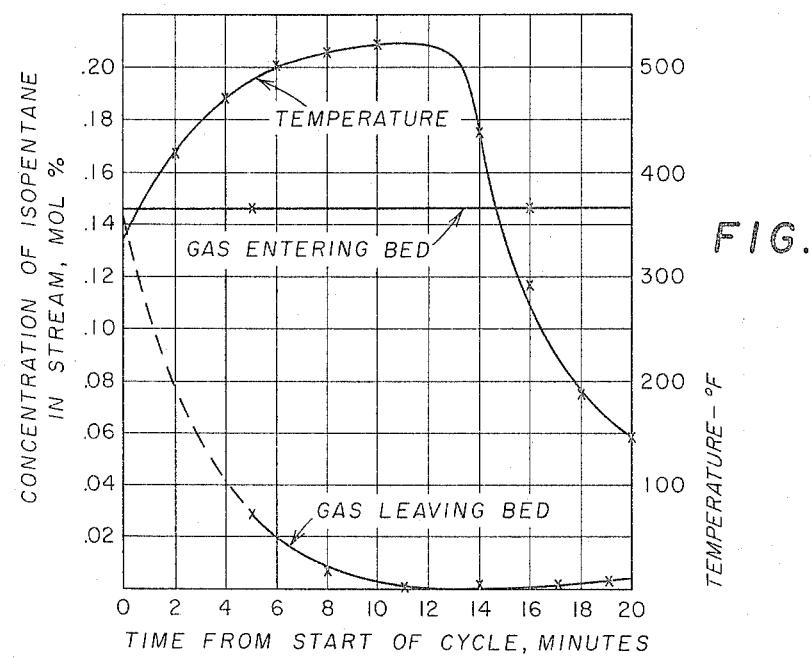
Figure 3:
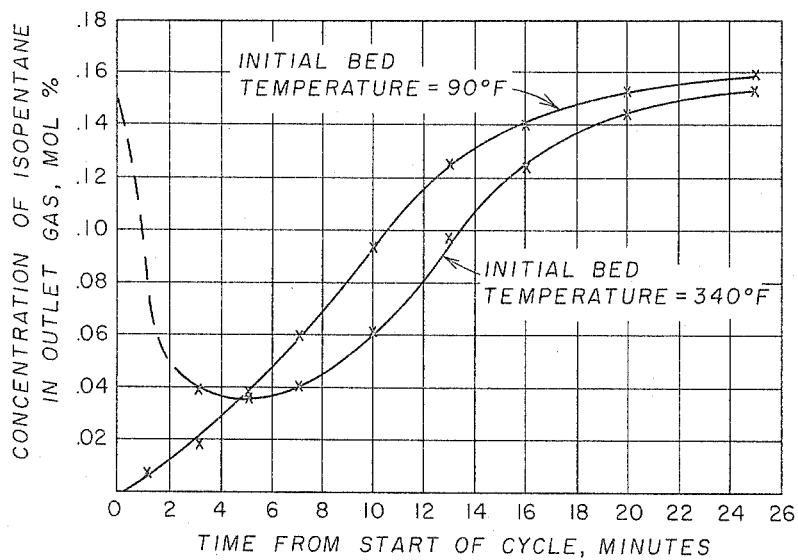

It is therefore an object of the present invention to provide a unit and process for the effective recovery of hydrocarbons from natural gas wherein the cooling function, previously required after each regeneration of a bed, is omitted. Another further object is to provide a process and a unit for the recovery of hydrocarbons, such as isopentane, wherein each bed is alternately operated in absorbing and regenerating functions. Another object is to provide a process and a unit, in accordance with the foregoing objects, employing a fast-cycle operation with two beds of a size usually found in a conventional three-bed unit and using the moderate instrumentation of a conventional two-bed unit. These and other objects will be more apparent when read in conjunction with the following detailed description, the appended claims, and the attached drawings wherein:

FIGURE 1 is an illustration of a solid adsorbent hydrocarbon recovery unit arranged in accordance with this invention;

FIGURE 2 is a graph illustrating the relationship between the concentration of isopentane in, and the temperature of, a natural gas leaving a bed conventionally operating in an adsorbing function; and FIGURE 3 is a graph illustrating the adsorption of isopentane from natural gas in the operation of a regenerated bed of solid adsorbent in an adsorbing function in accordance with (1) the process of the present invention, and (2) the conventional process after the regenerated bed has been cooled.

The objects of the present invention are achieved by utilizing a solid adsorbent hydrocarbon recovery unit, and a process for its operation, wherein a main flow stream of natural gas alternately is passed through a first bed of adsorbent and a second bed of adsorbent while passing a heated regeneration gas through the other of the beds not receiving the main flow stream of natural gas to desorb at least a portion of the hydrocarbons adsorbed by each of the beds and recovering the desorbed hydrocarbons from the regeneration gas.

Referring now to FIGURE 1, one embodiment of a solid adsorbent hydrocarbon recovery unit, and a process, of the present invention will be described. The solid adsorbent hydrocarbon recovery unit, hereinafter referred to as "unit" contains at least two towers, 11 and 12. The towers 11 and 12 are suitable vessels in which are operatively contained beds of solid adsorbent. Any solid adsorbent may be used which is adapted to preferentially adsorb the hydrocarbons desired to be recovered from natural gas. For example, the hydrocarbons to be recovered may be isopentane and similar heavy hydrocarbons. Examples of usable solid adsorbents are silica gel, activated charcoal, and other solid desiccants such as one identified as "Sorbead H", a registered trademark of Socony Mobil Oil Company, Inc. Preferably, the solid adsorbent in the towers 11 and 12 is "Sorbead H" for good results. The towers 11 and 12 are interconnected by suitable flow switching means whereby natural gas is passed through one of the towers in an adsorbing function while a heated regeneration gas is passed through the other of the towers in a regenerating function; and the gas streams flowing through each of the towers are switched to the other of the towers at the conclusion of each cycle of operation.

The flow switching means may be of any design capable of providing the desired application of fluid streams to the towers 11 and 12. In this embodiment of the unit, the towers 11 and 12 are associated with several valves interconnected by suitable conduits so arranged that each of the towers alternately receives (1) an inflow of natural gas and emanates an outflow of lean natural gas with a reduced content of heavier hydrocarbons, and (2) an inflow of a hot regeneration gas and emanates an outflow of an enriched regeneration gas containing desorbed heavy hydrocarbons. More particularly, three-way valves 13 and 14 are connected to the inlets of the towers 11 and 12, respectively. Three-way valves 16 and 17 are connected to the outlets of such towers 11 and 12, respectively. An inlet conduit 18 carrying natural gas to be processed is connected through a conduit 19 to the valves 13 and 14. A conduit 21 to receive the lean natural gas effluent from each of the towers is connected through a conduit 22 to the valves 16 and 17. A conduit 23 carrying hot regeneration gas is connected through a conduit 24 to the valves 13 and 14. A conduit 26 to receive the enriched regeneration gas effluent from each of the towers is connected through a conduit 27 to the valves 16 and 17.

The flow switching means through adjustment of the mentioned three-way valves, for example as shown in FIGURE 1, provides a flow of natural gas from the conduit 18 through the tower 11 and into the conduit 21. Simultaneously, such means provides a flow of regeneration gas, which has been heated, from the conduit 23 through the tower 12 and into the conduit 26. Thus, the towers 11 and 12 are operated in adsorbing and regenerating functions, respectively. Another suitable adjustment of the mentioned three-way valves causes the towers 11 and 12 to be operated in regenerating and adsorbing functions, respectively.

The tower 11 or 12 receiving natural gas adsorbs the heavy hydrocarbons, such as isopentane, and provides a lean natural gas stream in the conduit 21. The other of the towers 11 and 12 receiving regeneration gas is desorbed of the previously adsorbed heavy hydrocarbons and provides an enriched regeneration gas stream in the conduit 26.

The lean natural gas in the conduit 21 is passed through a heat exchanger 28, and thence through a service conduit 29 to a suitable utilization, such as a sales gas pipeline 31. The heat exchanger 28 is utilized to cool indirectly with another fluid at least the first portion of the lean natural gas stream which is at a relatively high temperature to protect downstream equipment since in accordance with this invention natural gas from the conduit 18 flows directly into either the heated tower 11 or 12 immediately after it has been regenerated and without any intermediate cooling. The fluid used in the heat exchanger 28 to cool the lean natural gas will be described more fully hereinafter.

The regeneration gas to be passed through the towers 11 or 12, for example the tower 12, from the conduit 23 in this embodiment of the "unit" is a portion of flow of the natural gas in the conduit 18. Thus, open-cycle regeneration is used. A part of the natural gas flow which becomes the lean regeneration gas is taken from the conduit 18 through an orifice 32 interposed in a connecting conduit 33. A motor valve 34 interposed in the conduit 18 downstream of the connection with the conduit 33 regulates the amount of natural gas which flows into the conduit 33. A controller 36 for operating the valve 34 responsive to a pressure differential across the orifice 32 may be used to regulate automatically the amount of natural gas flowing into the conduit 33. Usually, the flow of regeneration gas is a small portion, for example about one-third, of the flow of natural gas into the tower 11 or 12. The regeneration gas from the conduit 33 flows through a three-way valve 37 into either a conduit 38 and the heat exchanger 28 or a conduit 39 to bypass the heat exchanger 28. The valve 37 may be time controlled, or it may be controlled from the temperature of the lean natural gas in the conduit 21. By this means, the regeneration gas flow can be directed through the conduit 38 to the heat exchanger 28 to be preheated by the lean natural gas while it is relatively hot. At other times, the regeneration gas may be bypassed in the conduit 39 around the heat exchanger 28, if desired. The regeneration gas from the heat exchanger 28 flows through a conduit 41 and a check valve 42 into a conduit 43. The regeneration gas in the conduit 39 flows directly from the conduit 33 through an interconnection into the conduit 43. The regeneration gas is now heated to elevated temperatures by any means such as by a heater 44 connected to receive the flow from the conduit 43. The heater 44, of any conventional design, is operated to heat the regeneration gas to a temperature sufficient to desorb the heavy hydrocarbon priorly adsorbed in the towers 11 and 12. A suitable temperature of the regeneration gas may be, for example, about 500° F. The hot regeneration gas flows from the heater 44 into the conduit 23, the conduit 24, and through one of the valves 13 and 14 into one of the towers 11 and 12 not receiving natural gas from the conduit 19. The regeneration gas after traversing such one of towers 11 and 12, passes therefrom into the conduit 27 through the valve 16 or the valve 17 and then into the conduit 26. For example, the regeneration gas flows from the conduit 24 via the valve 14 through the tower 12 and via the valve 17 into the conduit 27 for passage into the conduit 26. The regeneration gas now is enriched by the desorbed hydrocarbons, particularly isopentane, removed from the towers 11 and 12. The enriched regeneration gas in the conduit 26 lastly is subjected to a separation process to recover the desorbed hydrocarbons. Any suitable means for this purpose may be used. Preferably, the enriched regeneration gas from the conduit 26 flows through a cooler 46, of any suitable type, to be cooled to a suitable dew point and then into the conduit 47. It will be appreciated that the first portions of the regeneration gas flow in the conduit 26 are cooled somewhat by passing through the towers 11 and 12 which have been cooled by the natural gas flow during operation in an adsorbing function. However, a temperature in the enriched regeneration gas approaching that of the regeneration gas from heater 44 is substantially attained toward the terminal portion of the regeneration gas flow through each of the towers 11 and 12. This variation in the amount of cooling normally requires a periodic large excess of capacity in the cooler 46. However, this problem in the present unit in the excess capacity for the cooler 46 to cool the enriched regeneration gas is compensated for by periodically using auxiliary cooling means connected through a three-way valve 48 in the conduit 47. The auxiliary cooling means will be fully described hereinafter in connection with the cooling of the lean gas in the conduit 21. The valve 48 may be either temperature controlled or time controlled so that when the temperature of the enriched regeneration gas sufficiently is reduced in the cooler 46 it flows through the valve 48 into a conduit 49, through a three-way valve 51 into a conduit 52 and thence to a gas-liquid separator 53.

The separator 53, of any conventional design, separates the enriched regeneration gas into a stripped regeneration gas similar in composition to the natural gas in the conduit 18 and the desorbed heavy hydrocarbons as a liquid. The heavy hydrocarbons, as the liquid, are removed from the separator 53 through a conduit 54 and passed to any suitable utilization. A suitable liquid level can be maintained in the separator 53 by means of a motor valve 55 connected in the line 54. The stripped regeneration gas is removed from the separator 53 through a conduit 56 and returned to the inlet conduit 18 for passage into either the tower 11 or 12, whichever is operated in an adsorbing function.

It will be appreciated that the heat contents of the lean gas in the conduit 21 and the enriched regeneration gas in the conduit 26 vary immensely in each stream, and also inversely to one another, because the towers 11 and 12 are operated directly between adsorbing and regenerating functions. For example, the lean gas in the conduit 21 is initially very hot, about 500° F.; and later, after cooling the tower through which it flows, it is at ambient temperatures of about 90° F. Similarly, the enriched regeneration gas in the conduit 26 is initially cool, at ambient temperatures of about 90° F., and later is very hot, about 500° F., after heating the tower through which it flows. The heat exchanger 28 and the cooler 46 would have to have a large capacity only for a short period to operate adequately with these gas streams as a result of the wide variance in their temperatures between initial and terminal flows. The following arrangement of this invention provides the priorly mentioned auxiliary cooling means so that a cooling capacity less than the large excess normally required in the heat exchanger 28 and also the cooler 46 can be used in adequately cooling both the lean gas and enriched regeneration gas to satisfactory levels.

The lean gas, while excessively hot in the conduit 29 downstream of the heat exchanger 28, is blocked from the pipeline 31 by a three-way valve 62 which may be temperature or time controlled and as a result flows through a conduit 57 containing a check valve 58 and a flow control valve 59 into the auxiliary cooling means, such as a second cooler 61. The cooler 61 may be of any type, such as an atmospheric heat exchanger. The lean gas now cooled to a satisfactory temperature in the cooler 61 flows into a conduit 63 through the valve 62 into the pipeline 31. The valve 62 operates to direct flow from the conduit 29 into the pipeline 31 when the leans gas is adequately cooled by the heat exchanger 28. The temperature of the enriched regeneration gas in the conduit 26 becomes relatively very high at a time when excess cooling of the lean gas in the cooler 61 is not needed. At this time, the enriched regeneration gas exiting the cooler 46 in the conduit 47 is diverted by the valve 48 via a conduit 64 into the cooler 61. The enriched regeneration gas cooled to a satisfactory temperature in the cooler 61 flows into a conduit 66. The flow of enriched regeneration gas into the conduits 57 and 63 is blocked by the check valve 58 and the valve 62, respectively. The conduit 66 contains a check valve 67 through which the enriched regeneration gas flows through a connection into the conduit 49 and eventually into the separator 53.

The fluid used to indirectly cool the lean natural gas in the heat exchanger 28 may be the lean regeneration gas in the conduit 33. However, the enriched regeneration gas from the conduit 49 or the conduit 66 may be indirectly cooled in the heat exchanger 28 by the lean natural gas. For this purpose, a second check valve 68 is contained in the conduit 66 downstream of the connection with the conduit 49 and upstream of its connection to the conduit 38. The enriched regeneration gas cannot flow from the conduits 49 and 66 through the conduit 38 into the heat exchanger 28 when lean regeneration gas is flowing in the conduit 38. The lean regeneration gas from the conduit 33 is at a higher pressure than enriched regeneration gas in the conduit 66 and thus closes the check valve 68 to flow in the conduit 66.

However, when the lean regeneration gas flows through the bypass conduit 39 into the conduit 43 and the valve 51 blocks flow in the conduit 49, the heat exchanger 28 receives the flow of the enriched regeneration gas from the conduit 66 through the conduit 38. The check valve 42 in the conduit 43 closes since the lean regeneration gas therein is at a higher pressure than the enriched regeneration gas originating in the conduit 66. A conduit 69 interconnecting the conduit 41 and the three-way valve 51 provides a fluid communication for the enriched regeneration gas to flow from the heat exchanger 28 to the conduit 52 and the separator 53. Thus, the extra cooling capacity of the cooler 61 advantageously supplements the cooling capacity of both the heat exchanger 28 and the cooler 46 so that the excessive temperatures of both the lean natural gas and the enriched regeneration gas can be reduced in the same auxiliary cooling means without intermixing.

It will be recognized that the lean natural gas when at its hottest is used to preheat the lean regeneration gas prior to its introduction into the heater 44 in the heat exchanger 28. Also exchanging of heat contents at a later time between the enriched regeneration gas and the lean natural gas in the heat exchanger 28 is of advantage since the flow of lean natural gas in the conduit 21 is becoming relatively cold while the enriched regeneration gas in the conduit 26 is becoming relatively hot. Thus, even more cooling of the enriched regeneration gas prior to introduction into the separator 53 can be obtained by using the heat exchanger 28 as an auxiliary cooling means in addition to the cooler 61.

From the description of the flow switching means it will be obvious that natural gas is alternately passed through the tower 11 and then the tower 12 while a heated regeneration gas is passed through the other of the towers not receiving natural gas. Further, the desorbed hydrocarbons carried in the regeneration gas are recovered in the separator 53.

Although the first embodiment of the present invention has been described in conjunction with open-cycle regeneration, other types of regeneration procedures may be utilized to equal advantage. For example, the heretofore described unit may be readily converted to an embodiment having closed-cycle regeneration. This result may be accomplished by diverting the flow of stripped regeneration gas in the conduit 56 from the inlet conduit 18 and also by preventing any dilution of enriched regeneration gas by the lean natural gas flowing into the sales pipeline 31. A valve 71 interposed in the conduit 56 is closed and a check valve 72 is disposed in the conduit 33 to block the stripped regeneration gas from the conduit 18. A conduit 73 (in chain line) containing a motor driven compressor 74 is the fluid connection between the conduit 56 upstream of the valve 71 and the conduit 33 downstream of the check valve 72 to provide a suitable means for recirculating the regeneration gas through the towers 11 and 12 and in the regeneration system. The valve 59 is closed to prevent direct fluid connection between the lean natural gas in the conduit 29 and the regeneration gas. It will be apparent that the regeneration gas will be circulated by the compressor 74 from the conduit 56 through the valve 37 and then through either the conduit 38 or 39 into the conduit 43. The regeneration gas in the conduit 43 then flows in the same manner as has been previously described for the regeneration gas in the open-cycle regeneration of the first embodiment of this invention. The valve 59 may be opened to permit the flow in conduit 57 of the lean natural gas only until its temperature is reduced to an acceptable value if dilution of the regeneration gas is acceptable. The functioning of this unit with closed-cycle regeneration is the same as for the previously described embodiment.

Although the reasons for attaining the results by the present invention through the omission of placing either of the towers in a cooling function after a regenerating function are not known with certainty, the following statement is proffered as one explanation of this phenomena.

The recovery of hydrocarbons during the conventional operation of a tower containing a solid adsorbent is a function of the difference between the initial and final hydrocarbon saturations of such adsorbent. The cooling function determines the initial hydrocarbon saturation of the solid adsorbent while the adsorbing function determines the final hydrocarbon saturation of the solid adsorbent. The cooling function in conventional operations establishes the initial hydrocarbon saturation of the solid adsorbent since the hydrocarbon saturation is at a minimum at the end of the regenerating function. Also, undertaking the adsorbing function in a tower at increased temperatures provides for a more selected adsorption of the most desirable of the heavy hydrocarbons, such as isopentane, from natural gas. In theory, a greater proportionate amount of lighter hydrocarbons, such as propane, than the heavy hydrocarbons, such as isopentane, are adsorbed at the lower tower temperatures encountered during and after the usual cooling function. The magnitude of the interference of these light hydrocarbons adsorbed by a tower in the cooling function with the adsorption of isopentane and like heavy hydrocarbons during the adsorbing function is dependent more on the concentration of the lighter hydrocarbons in the tower cooling gas than in the natural gas utilized during the adsorbing function. Although the isopentane and like heavy hydrocarbons will displace to some extent the previously adsorbed lighter hydrocarbons from a tower during the adsorbing function, the adsorption efficiency of the solid adsorbent to isopentane and like heavy hydrocarbons appears to be less than if the solid adsorbent initially had adsorbed less of the lighter hydrocarbons. Thus, the greater the hydrocarbon presaturation of a tower during the cooling function, especially of the light hydrocarbons such as propane, the greater the adverse effect on the recovery by adsorption of the heavy hydrocarbons, such as isopentane, during the adsorbing function. In conclusion, the omission of the cooling function and the operation of the adsorbing function at higher initial temperatures than in conventional procedures will provide a satisfactory, and usually a superior, recovery of the heavy hydrocarbons from natural gas. Obviously, this is an embodiment of the present invention. These statements are believed supported, as to their correctness, by the following experimental data.

Test I was made under conditions representative of the operation of a tower containing a solid adsorbent such as found in commercial hydrocarbon recovery units in an adsorbing function immediately after regeneration without an intervening cooling function. The tower was a vertical cylinder of 13 inches in diameter and 10 feet in height. A bed of solid adsorbent was provided by filling the tower with "Sorbead H," a solid desiccant. The tower was operated first on an adsorbing function as in a commercial unit designed for processing 1MM s.c.f./d. of natural gas. After completion of the adsorbing function, the tower was regenerated with a stream of natural gas having the composition set forth below in Table I. In the units of flow in this description, each "M" is one thousand and "s.c.f./d." is standard cubic feet per day.

TABLE I.—COMPOSITION OF NATURAL GAS TO TOWER

| Component: | Mol percent |
|---|---|
| $C_1$ | 95.28 |
| $C_2$ | 2.65 |
| $C_3$ | .86 |
| $i-C_4$ | .31 |
| $n-C_4$ | .29 |
| $i-C_5$ | .15 |
| $n-C_5$ | .09 |
| $C_6+$ | .37 |
| Total | 100.00 |

The regeneration stream of natural gas was heated to about 520° F. prior to being passed through the tower. The regeneration stream of natural gas was passed at a rate of 455M s.c.f./d. and at a pressure of 1015 p.s.i. through the tower until the natural gas leaving the tower had a temperature of about 450° F. At this time, the adsorbed isopentane and like heavy hydrocarbons were substantially removed.

The flow of this natural gas then was continued at the above rate through the tower but unheated with a temperature of about 70° F. This flow provided for operating the tower without any prior cooling in a conventional adsorbing function. Periodic samples of the lean natural gas leaving the tower were obtained. The temperature and concentration of isopentane in each of such samples were determined. The results of these determinations are graphically presented in FIGURE 2. In FIGURE 2 it will be seen from the lower curve that the concentration of isopentane in the natural gas leaving the bed in the tower decreased rapidly from the start of the adsorbing function. Thus, the bed was adsorbing most of the isopentane from the natural gas. About the middle of the adsorbing function, there was only a trace of isopentane in the natural gas leaving the bed. However, the temperature of the natural gas leaving the bed in the tower was reaching a maximum of about 520° F. This appears to indicate clearly that the solid adsorbent bed in the tower was cooled enough to adsorb substantially all the heavy hydrocarbons, particularly isopentane, while the tower at its effluent end is yet at the maximum temperature for desorption. The natural gas leaving the bed for the remainder of the cooling function had a very low concentration of isopentane as its temperature fell rapidly.

The isopentane in the outlet natural gas is not all derived from the natural gas passed into the tower. For example, that portion of the lower curve represented by the chain line was mostly isopentane yet being desorbed from the heated portions of the solid adsorbent bed. Thus, as a conclusion from this test, only a relatively small amount of isopentane was not adsorbed by the bed in the tower from the natural gas even though the bed had a very high initial temperature such as would occur by practicing this invention in switching a bed directly from a regenerating to an adsorbing function.

Tests II and III were made on a smaller tower to provide a direct comparison between the procedure of operating a tower on an adsorbing function after it has been regenerated and cooled and the procedure of this invention where a tower is alternately operated on adsorbing and regenerating functions, entirely omitting a cooling function.

In both Tests II and III, a vertically disposed cylindrical vessel having a diameter of about 4 inches and a height of 10 feet was used as a tower. A bed of 35 pounds of the solid desiccant, "Sorbead H," was placed in the vessel. Suitable flow means were attached to the vessel so that natural gas at a relatively constant temperature and pressure could be passed therethrough. Means were provided at the outlet of the vessel to periodically obtain samples of the effluent natural gas. Prior to each of the Tests II and III, the bed in the vessel was regenerated with a natural gas heated to about 500° F., under conditions representing the conventional operation of a regeneration function in the vessel. In Test II, the vessel was sealed after regeneration and allowed to cool to a temperature of 90° F. in the bed of solid desiccant to prevent presaturation by any hydrocarbons in a cooling gas. Then, a natural gas was passed through the vessel in accordance with the data set forth in the following Table II. In Test III, the vessel was placed on the adsorbing function immediately after being regenerated and while it had an average temperature of 340° F. in the bed of solid desiccant. Natural gas, the same for present purposes as in Test II, was passed through the vessel under the conditions set forth in the follow Table II.

TABLE II

| Natural Gas | Test II | Test III |
|---|---|---|
| (1) Composition (Mol Percent): | | |
| $C_1$ | 95.12 | 95.24 |
| $C_2$ | 2.77 | 2.69 |
| $C_3$ | .91 | .87 |
| $i\text{-}C_4$ | .32 | .31 |
| $n\text{-}C_4$ | .31 | .30 |
| $i\text{-}C_5$ | .15 | .15 |
| $n\text{-}C_5$ | .11 | .10 |
| $C_6+$ | .31 | .34 |
| Total | 100.00 | 100.00 |
| (2) Flow Rate Through the Bed (M s.c.f./d.) | 264 | 277 |
| (3) Temperature at Vessel Inlet (° F.) | 82 | 75 |
| (4) Pressure at Vessel Inlet (p.s.i.) | 1,010 | 1,005 |

The samples of the natural gas effluent from the vessel in Tests II and III were analyzed for their content of isopentane. The results of these Tests II and III are displayed in FIGURE 3 as the curves "Initial Bed Temperature=90° F. and Initial Bed Temperature=340° F.," respectively.

Referring now to FIGURE 3, it will be noted from the curves reflecting the Tests II and III that the amount of isopentane lost during the adsorbing function was less from the bed having the higher initial temperature. One explanation for this result is that at any given time a portion of the bed of solid adsorbent was cooled sufficiently to adsorb isopentane from the natural gas and that such portion is greater in extent than whatever portion of the bed actually is needed to adsorb most of the isopentane and like heavy hydrocarbons from the natural gas. In operation of beds of solid adsorbent between adsorbing and regenerating functions in accordance with this invention, the natural gas preferably has no greater concentration of heavy hydrocarbons than can be adsorbed in that portion of the bed cooled sufficiently to adsorb them from the natural gas for best results. The majority of the Test III curve resides below the Test II curve. Thus, the difference in area beneath the curves shows that during Test III measurably less isopentane was lost from the bed than during the Test II where a cold bed of solid adsorbent was used. A reason for this result is that the bed in Test III was more selectively adsorbing the heavy hydrocarbons as a result of its higher temperature since no error was possible in the curve of Test II from a presaturation of the cold bed by a cooling gas. Thus, it is seen that the placing a tower containing a bed of solid adsorbent at regenerating temperatures directly into operation in the adsorbing function appears to increase to some extent the amount of isopentane and similar heavy hydrocarbons that can be recovered from natural gas as compared to that amount of isopentane which can be recovered in conventional operations where the adsorbing function is practiced only after a cooling function has been completed.

From the foregoing, it will be apparent that the solid adsorbent used in a tower does not require a cooling function after being regenerated to produce an acceptable, if not a superior, adsorption of heavy hydrocarbons, such as isopentane, from natural gas. This physical phenomenon provides a great advantage by its utilization in the present invention. As previously stated, the three-lower unit with a fast cycle was developed because its beds could be sized much smaller than the beds of a two-tower unit with a long cycle. If the time allowed for the cooling and regenerating functions were set to be equal in duration for a two-tower unit, the bed size for a three-tower unit, for the same application of process criterion, would be one-half the size of the beds required for the two-tower unit. However, the solid adsorbent bed for a two-tower unit can be the same size as the bed for the three-tower unit for the same result by eliminating the cooling function in accordance with the present invention. Further, this new two-tower unit can be operated on a fast cycle with only moderate instrumentation. The advantages of such a unit of this invention over the known three-tower and two-tower units will be appreciated by those skilled in the art. The principal advantages are that the two-tower unit operated and constructed in accordance with the present invention (1) eliminates at least one tower and the associated valves and desiccant formerly used in the known three-tower unit, and (2) utilizes a tower one-half the size of conventional two-tower unit in a fast cycle but with moderate instrumentation so that in any event the capital inventment of the two-tower unit of this invention will be less than that known in the two-tower and three-tower units for acceptable results.

From the foregoing it will be apparent that the system of this invention satisfies all of the stated objects. Various changes and alterations to the described system may be made by those skilled in the art without departing from the scope of this invention. It is intended that such changes and alterations be encompassed within the appended claims and that such claims set forth the only limitations of this invention inasmuch as the foregoing description is to be taken as a means of illustration.

What is claimed is:

1. A process for recovering hydrocarbons in a solid adsorbent hydrocarbon recovery unit from a main flow stream of natural gas comprising the steps of:
    (a) passing the main flow stream of natural gas through a first and only bed of solid adsorbent so that at least a portion of the hydrocarbons therein is adsorbed in such bed,
    (b) passing a flow of heated regeneration gas through a second bed of solid adsorbent so that at least a portion of the hydrocarbons therein is desorbed from such bed,
    (c) passing the main flow of natural gas through the second and only bed when in a heated condition after regeneration and passing the flow of heated regeneration gas through the first bed, and
    (d) recovering the hydrocarbons desorbed from the first and second beds from the regeneration gas while repeating the steps (a), (b), and (c).

2. A solid adsorbent hydrocarbon recovery unit comprising:
    (a) a first and second bed of solid adsorbent,
    (b) flow switching means for passing natural gas through the first bed to produce a lean natural gas and for passing a heated lean regeneration gas through the second bed to regenerate same and to produce an enriched regeneration gas, and thereafter passing the lean natural gas through the second bed and the heated regeneration gas through the first bed,
    (c) regeneration means providing for heating a flow of lean regeneration gas for application to the beds and for recovering desorbed hydrocarbons from the enriched regeneration gas,
    (d) a first means for heat exchanging the lean natural gas with lean regeneration gas to heat said lean regeneration gas,
    (e) a second means for cooling the enriched regeneration gas, and
    (f) flow control means for bypassing the flow of lean regeneration gas from the first means and for passing the enriched regeneration gas in heat exchanging relationship with the lean natural gas when the lean natural gas is sufficiently cold that the heat it can provide to the lean regeneration gas is less than the amount of heat it can remove from the enriched regeneration gas.

3. A process for recovering hydrocarbons in a solid adsorbent hydrocarbon unit containing a plurality of beds of solid adsorbent from a main flow stream of natural gas comprising the steps of:

(a) passing the main flow stream of natural gas alternately through a first bed of solid adsorbent and then a second bed of solid adsorbent to provide a lean natural gas stream, and passing a lean regeneration gas after being heated through the other of the beds not receiving the main flow stream of natural gas to provide an enriched regeneration gas stream which has desorbed at least a portion of the hydrocarbons priorly adsorbed by each of the beds, (b) indirectly heat exchanging the lean natural gas stream with the lean regeneration gas, (c) cooling the enriched regeneration gas, (d) indirectly heat exchanging the lean natural gas stream with the enriched regeneration gas in the place of the lean regeneration gas when the lean natural gas is sufficiently cold that the heat it can provide to the lean regeneration gas is less than the amount of heat it can remove from the cooled enriched regeneration gas, and (e) recovering the desorbed hydrocarbons from the enriched regeneration gas.

4. A process for recovering heavy hydrocarbons from a main flow stream of natural gas comprising the steps of:

(a) passing the main flow stream of natural gas at a first temperature through a first and only adsorbent bed for adsorbing the heavy hydrocarbons therefrom, (b) passing a heated regeneration gas through a second adsorbent bed for heating said bed to an elevated second temperature sufficient to desorb substantially the heavy hydrocarbons adsorbed therein, (c) providing a solid adsorbent in said adsorbent beds having a greater preferential adsorption of the heavy hydrocarbons at about the elevated second temperature than at about the first temperature, (d) switching the flows of natural gas and regeneration gas directly between the adsorbent beds without a prior cooling of said second adsorbent bed so that heated regeneration gas passes through the first adsorbent bed when substantially saturated by adsorption of the heavy hydrocarbons and natural gas passes through the second and only adsorbent bed when substantially desorbed of the heavy hydrocarbons, and (e) recovering the desorbed heavy hydrocarbons from the regeneration gas.

5. A process for recovering hydrocarbons in a solid adsorbent hydrocarbon unit containing first and second beds of solid adsorbent from a main flow stream of natural gas comprising the steps of:

(a) passing the main flow stream of natural gas alternately through a first and only bed of solid adsorbent and then a second and only bed of solid adsorbent when each bed is in a heated condition after regeneration to provide a lean natural gas stream, and pasing a lean regeneration gas stream after being heated through the other of the first and second beds not receiving the main flow stream of natural gas to provide an enriched regeneration gas stream which has desorbed at least a portion of the hydrocarbons priorly adsorbed by each of the beds and leaving each bed in a heated condition after regeneration, (b) indirectly heat exchanging the lean natural gas stream with the lean regeneration gas stream when the lean natural gas provides heat to the lean regeneration gas to heat the lean regeneration gas, (c) cooling the enriched regeneration gas, and (d) recovering the desorbed hydrocarbons from the enriched regeneration gas.

6. A process for recovering heavy hydrocarbons from a main flow stream of natural gas in first and second adsorbent beds comprising the steps of:

(a) passing the main flow stream of natural gas at a first temperature through a first and only adsorbent bed for adsorbing the heavy hydrocarbons therefrom and providing a lean natural gas stream, (b) passing a lean regeneration gas stream after being heated through a second adsorbent bed for heating said bed to an elevated second temperature sufficient to desorb substantially the heavy hydrocarbons adsorbed therein and providing a heated rich regeneration gas stream, (c) providing a solid adsorbent in said adsorbent beds having a greater preferential adsorption of the heavy hydrocarbons at about the elevated second temperature than at about the first temperature, (d) switching the flows of natural gas and regeneration gas streams directly between the adsorbent beds without a prior cooling of said second adsorbent bed so that heated regeneration gas passes through the first adsorbent bed when substantially saturated by adsorption of the heavy hydrocarbons and natural gas passes through the second and only adsorbent bed when substantially desorbed of the heavy hydrocarbons, (e) indirectly heat exchanging the lean natural gas stream with a regeneration gas stream, and (f) recovering the desorbed heavy hydrocarbons from the regeneration gas and providing the lean regeneration gas stream.

References Cited by the Examiner

UNITED STATES PATENTS 2,588,296 3/1952 Russell _____ 55—33 X
2,759,560 8/1956 Miller _____ 55—180 X
3,186,144 6/1965 Dow _____ 55—180 X REUBEN FRIEDMAN, *Primary Examiner.*